US010042128B2

(12) United States Patent
Mullert

(10) Patent No.: US 10,042,128 B2
(45) Date of Patent: Aug. 7, 2018

(54) SPACE SAVING OPTICAL FIBER CONNECTOR

(71) Applicant: Acacia Communications, Inc., Maynard, MA (US)

(72) Inventor: David Mullert, Norton, MA (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 15/622,630

(22) Filed: Jun. 14, 2017

(65) Prior Publication Data

US 2017/0363815 A1 Dec. 21, 2017

Related U.S. Application Data

(60) Provisional application No. 62/351,386, filed on Jun. 17, 2016.

(51) Int. Cl.
G02B 6/38 (2006.01)

(52) U.S. Cl.
CPC ......... G02B 6/3877 (2013.01); G02B 6/3878 (2013.01); G02B 6/3893 (2013.01)

(58) Field of Classification Search
None
See application file for complete search history.

(56) References Cited

U.S. PATENT DOCUMENTS

| 5,450,515 A | 9/1995 | Bechtel et al. | |
| 5,689,598 A * | 11/1997 | Dean, Jr. | G02B 6/3879 385/53 |
| 6,398,423 B1 * | 6/2002 | Novacoski | G02B 6/3851 385/53 |
| 6,604,864 B2 | 8/2003 | Nguyen | |
| 6,702,478 B2 | 3/2004 | Inagaki et al. | |
| 6,752,538 B1 | 6/2004 | Bates, III | |
| 6,883,974 B2 | 4/2005 | Bates, III et al. | |
| 7,513,695 B1 | 4/2009 | Lin et al. | |
| 7,712,979 B2 * | 5/2010 | Shibata | G02B 6/3825 385/78 |
| 7,927,023 B2 | 4/2011 | Moriarty et al. | |
| 8,622,626 B2 * | 1/2014 | Pfnuer | G02B 6/3825 385/72 |
| 9,638,866 B2 * | 5/2017 | Ratcliffe | G02B 6/3821 |
| 2002/0150348 A1 * | 10/2002 | Nguyen | G02B 6/3821 385/59 |

(Continued)

Primary Examiner — Rhonda Peace
(74) Attorney, Agent, or Firm — Wilmer Cutler Pickering Hale and Dorr LLP

(57) ABSTRACT

In some embodiments, the present disclosure is directed at an optical fiber connector that occupies a small volume, and can therefore fit into small optical modules. In some embodiments, the optical fiber connector may comprise a removable faceplate. During installation, the faceplate may be removed to allow an optical fiber plug with a flange to be placed within the optical fiber connector. The flange may comprise one or more spring tabs. The faceplate may then be re-attached to the optical fiber connector, wherein at least a portion of the faceplate engages with the flange and secures the optical fiber plug with the optical fiber connector. The one or more spring tabs may also engage with the removable faceplate, thereby holding the optical fiber plug in place so as to ensure proper light transmission from the fiber to an opposing fiber.

20 Claims, 7 Drawing Sheets

(56) References Cited

U.S. PATENT DOCUMENTS

| | | | |
|---|---|---|---|
| 2017/0219779 A1* | 8/2017 | Takano | G02B 6/136 |
| 2017/0261696 A1* | 9/2017 | Compton | G02B 6/3869 |
| 2017/0261698 A1* | 9/2017 | Compton | G02B 6/3874 |
| 2017/0363815 A1* | 12/2017 | Mullert | G02B 6/3877 |

* cited by examiner

SPACE SAVING OPTICAL FIBER CONNECTOR

RELATED APPLICATIONS

This application claims priority to U.S. Provisional Application No. 62/351,386 titled "SPACE SAVING OPTICAL FIBER CONNECTOR" filed on Jun. 17, 2016, the entire contents of which are incorporated herein by reference.

TECHNICAL FIELD

The present disclosure relates to connectors for coupling optical fibers.

BACKGROUND

Current optical fiber connectors use a metal or plastic one or two piece connector body. One example of such optical fiber connectors are LC duplex connectors. However, with optical module form factors getting smaller, the need for compact fiber connectors is becoming more and more critical. There is therefore a need for compact optical fiber connectors that can fit into smaller optical modules, and that are also easy to install and service.

SUMMARY

According to one aspect, the present disclosure is directed at an optical fiber connector that occupies a small volume, and can therefore fit into small optical modules. In some embodiments, this optical fiber connector can reduce the volume necessary to house the hardware needed to establish the optical connection.

In some embodiments, the optical fiber connector can connect two or more optical fibers in a single connector assembly, such that signals passing along one or more optical fibers can be transmitted efficiently to one or more other optical fibers. Whereas prior optical fiber connectors required two separate connector ports, the presently disclosed optical fiber connector can eliminate the need for two separate ports, thereby reducing its size.

In some embodiments, the optical fiber connector can be configured to couple with one or more optical fibers using a standard, off-the-shelf LC connector, according to the IEC 61754-20 standard. The optical fiber connector can also be configured to couple with one or more optical fibers using a non-standard, compact connection that saves space. In some embodiments, the optical fiber connector can couple an optical fiber having an LC connector with an optical fiber having a non-standard, compact connection. In yet other embodiments, the optical fiber connector can couple two or more optical fibers having the non-standard, compact connections described herein with each other.

In some embodiments, the optical fiber connector may comprise a removable faceplate. During installation, the faceplate may be removed to allow an optical fiber plug with a flange to be placed within the optical fiber connector. The flange may comprise one or more spring tabs. The faceplate may then be re-attached to the optical fiber connector, wherein at least a portion of the faceplate engages with the flange and secures the optical fiber plug with the optical fiber connector. The one or more spring tabs may also engage with the removable faceplate, thereby holding the optical fiber plug in place so as to ensure proper light transmission from the fiber to an opposing fiber.

According to another aspect, the present disclosure is directed at a compact optical fiber connector, comprising: a connector body comprising a first end configured to couple with a first optical fiber; and a faceplate configured to be coupled to a second end of the connector body opposite the first end, wherein the faceplate defines an opening for a second optical fiber to pass through the faceplate; wherein, when the faceplate is coupled to the second end of the connector body, the faceplate and the second end of the connector body define an interior volume configured to receive a flange that extends radially outward from a longitudinal axis of the second optical fiber, the flange comprising one or more spring tabs configured to push against an interior surface of the faceplate, thereby biasing the flange against an interior surface of the second end of the connector body.

In some embodiments, the first end of the connector body comprises a standard LC connector port for receiving a standard LC plug attached to the first optical fiber.

In some embodiments, the compact optical fiber connector further comprises a split sleeve configured to receive and align a first fiber ferrule from the first optical fiber and a second fiber ferrule from the second optical fiber.

In some embodiments, the flange is shaped in the form of at least one of a disc, a rectangle, a triangle, and a hexagon.

In some embodiments, the flange has a diameter that is greater than a diameter of the second optical fiber.

In some embodiments, the faceplate is configured to be detachably coupled to the second end of the connector body using one or more screws.

In some embodiments, the faceplate is configured to be coupled to the second end of the connector body using at least one of a snap fit, a friction fit, a press fit, epoxy, sonic welding, and heat welding.

In some embodiments, each spring tab comprises at least one of a compression spring, wavy washer, finger washer, and photo etched spring tab.

In some embodiments, each spring tab is coupled to the flange using at least one of a press fit, adhesive, and screws.

In some embodiments, each spring tab is removably coupled to the flange.

In some embodiments, each spring tab is an integral part of the flange.

In some embodiments, the faceplate comprises at least one of plastic and metal.

According to another aspect, the present disclosure is directed at a method of connecting optical fibers, comprising: providing an optical fiber connector comprising: a connector body comprising a first end configured to couple with a first optical fiber; and a faceplate configured to be coupled to a second end of the connector body opposite the first end, wherein: the faceplate defines an opening, and when the faceplate is coupled to the second end of the connector body, the faceplate and the second end of the connector body define an interior volume. The method further comprises providing a first optical fiber; providing a second optical fiber having a flange that extends radially outward from a longitudinal axis of the optical fiber, the flange comprising one or more spring tabs; coupling the first optical fiber with the first end of the connector body; coupling the second optical fiber with the second end of the connector body by positioning the flange of the optical fiber so that it is adjacent to the second end of the connector body; passing the second optical fiber through the opening of the faceplate; and coupling the faceplate to the second end of the connector body such that the flange is received within the interior volume defined by the faceplate and the second end of the connector body, and the one or more spring tabs of the flange push against an interior surface of the faceplate, thereby biasing the flange against an interior surface of the second end of the connector body.

In some embodiments, the connector body further comprises a split sleeve having a first end and a second end, the first optical fiber includes a first fiber ferrule, and the second optical fiber includes a second fiber ferrule. Coupling the first optical fiber with the first end of the connector body can comprise inserting the first fiber ferrule into the first end of the split sleeve; and coupling the second optical fiber with the second end of the connector body can comprise inserting the second fiber ferrule into the second end of the split sleeve.

DETAILED DESCRIPTION

Figure 1:
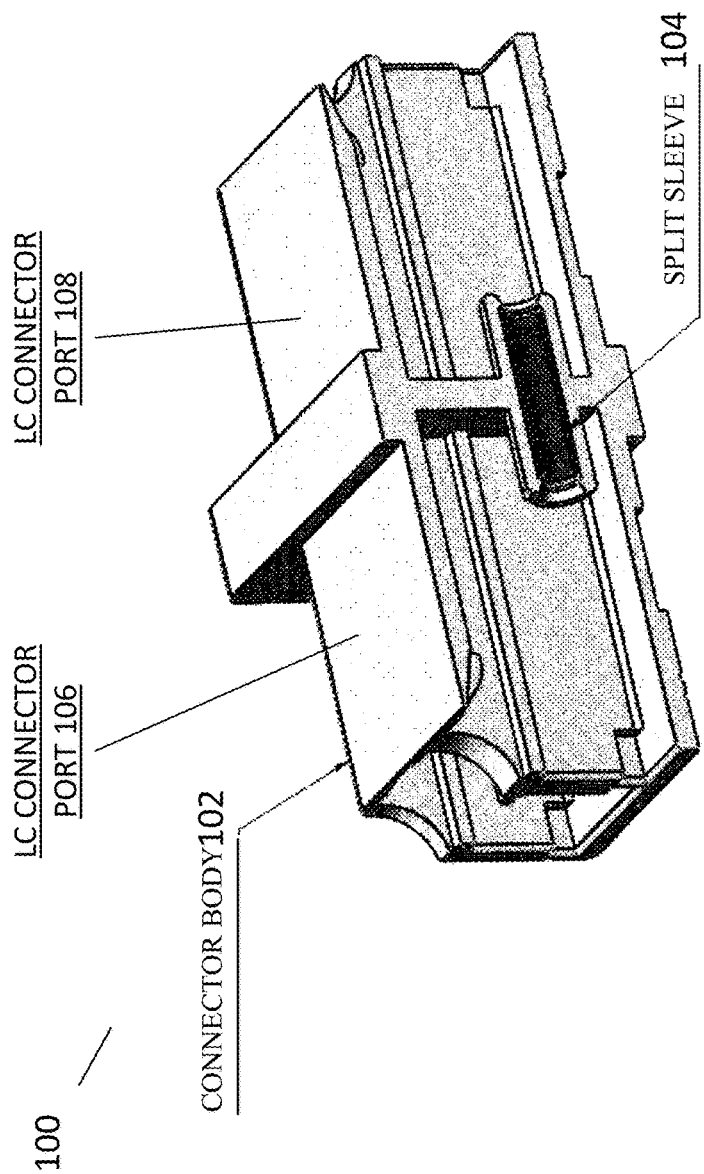
FIG. 1 is a cross-sectional view of a standard LC-LC adapter connector.

FIG. 1 is a cross-sectional view of a common, off-the-shelf LC-LC adapter connector 100. Current LC duplex connectors on the market today use a metal or plastic one or two piece connector body 102. The connector body 100 can comprise two or more opposing LC connector ports 106, 108, each configured to receive a standard LC plug. The connector body 102 can also house a ceramic or metallic split sleeve 104 that connects the LC connector ports 106, 108. The split sleeve 104 is a hollow tube or passage that is used to align fiber ferrule bodies.

Figure 2:
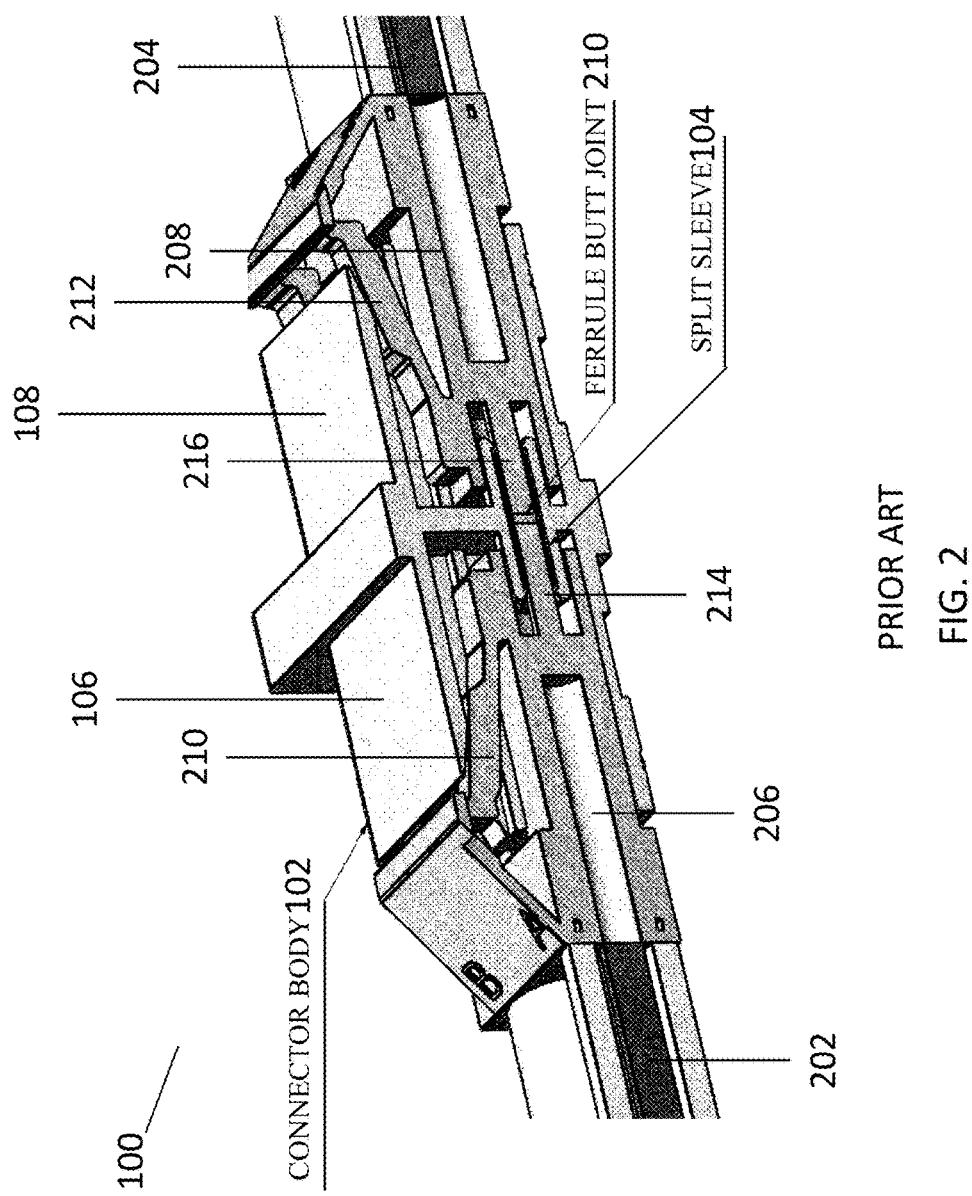
FIG. 2 is a cross-sectional view of a standard LC-LC adapter connector coupled with two optical fibers.
Figure 3:
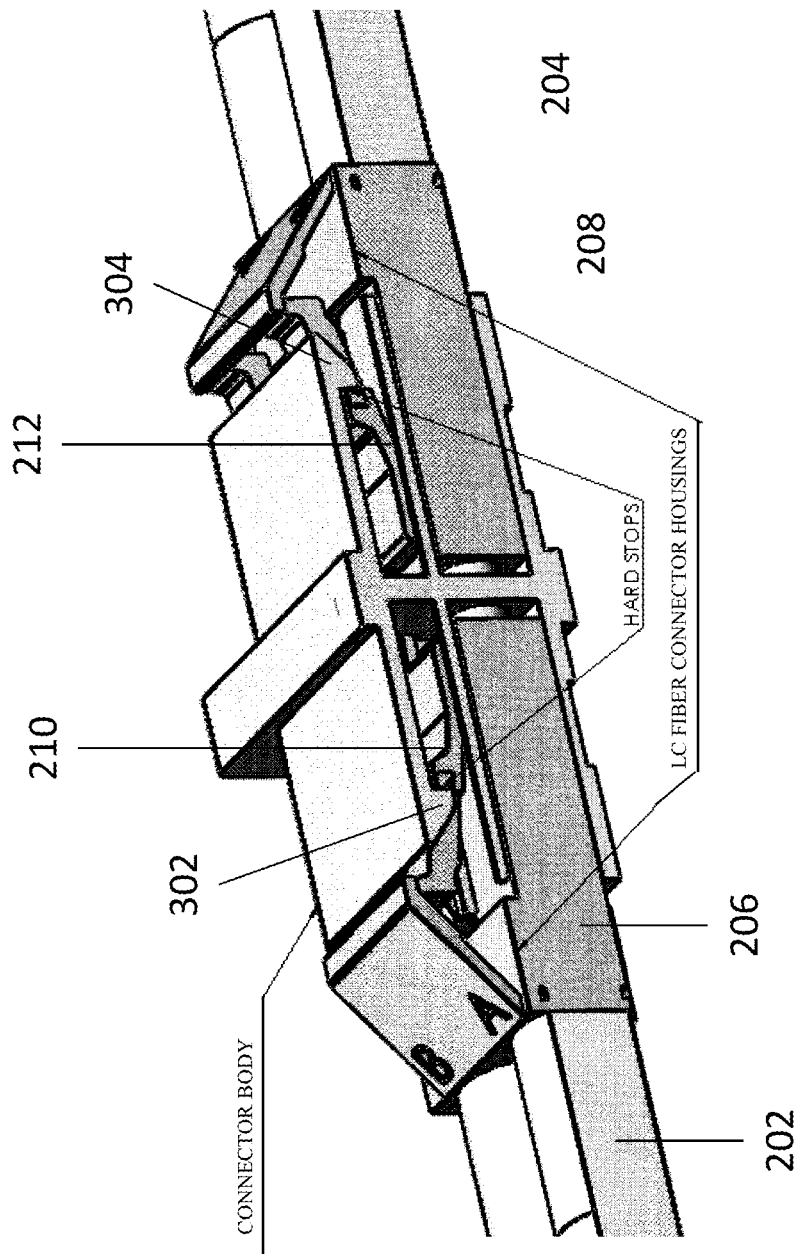
FIG. 3 is an exterior view of a standard LC-LC adapter connector.

FIG. 2 is a cross-sectional view of the LC adapter connector 100 coupled with two optical fibers 202 and 204. Each optical fiber 202, 204 comprise a standard LC plug 206, 208 respectively, and the LC plugs 206, 208 are plugged into LC connector ports 106 and 108, respectively. Each LC plug 206, 208 comprises a ferrule 214, 216 respectively that are configured to be pushed together in order to transmit optical signals from one optical fiber to another. When the two plugs 206, 208 are plugged into LC connector ports 106 and 108 on opposing sides of the adapter 100, ferrules 214, 216 slide into and are aligned by the split sleeve 104. A spring 210, 212 (respectively) in each LC plug 206, 208 engages with a hard stop 302, 304 (depicted in FIG. 3) disposed within LC connector ports 106 and 108 to hold the LC plug 206, 208 in place. The spring 210, 212 push the ferrules 214, 216 together under compression to allow proper light transmission.

Figure 4:
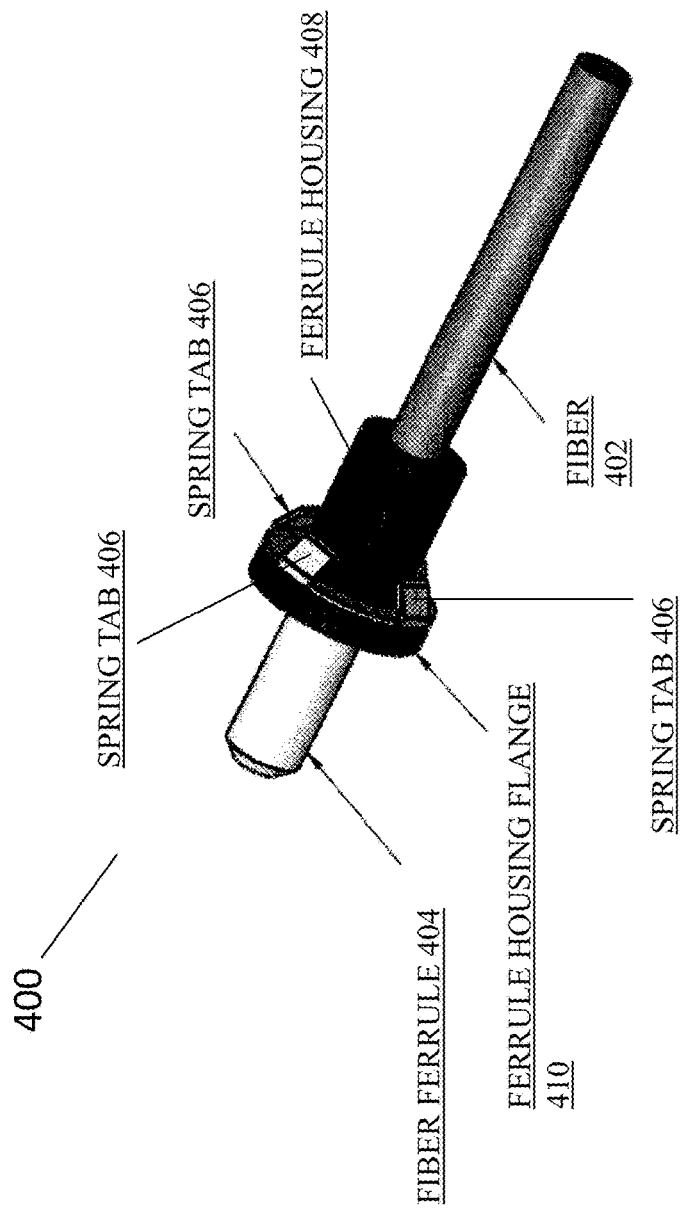
FIG. 4 depicts a custom optical fiber plug with an integral spring feature, according to some embodiments.

FIG. 4 depicts a custom optical fiber plug 400 with an integral spring feature, according to some embodiments. The fiber plug 400 may be coupled to one end of an optical fiber 402 and may comprise a ferrule housing 408. Ferrule housing 408 may be at least partially made from metal, plastic, or any suitably rigid material, and may comprise a ferrule housing flange 410 that extends outward in at least one direction perpendicular to the axis of the fiber 402. In some embodiments, ferrule housing flange 410 may take the form of an annular, disc-shaped flange that extends radially outward from the axis of the fiber 402, but other shapes are also possible. For example, ferrule housing flange 410 may be shaped in the form of a rectangle, a triangle, a hexagon, or any other suitable shape. Ferrule housing flange 410 may also comprise one or more spring tabs 406. Although FIG. 4 depicts three spring tabs 406, other embodiments may have fewer or more spring tabs 406. Each spring tab 406 may comprise a compression spring, wavy washer, finger washer, or a photo etched spring tab. Spring tabs 406 may be attached to flange 410 in various ways, such as a press fit, adhesive, screws, or other methods known in the art. In some embodiments, spring tabs 406 need not be fixedly retained on ferrule housing 406, but may be removable. In some embodiments, spring tabs 406 may be an integral part of ferrule housing 406, e.g., the two components may be formed from one monolithic plastic or metal component. Fixedly retaining spring tabs 406 on ferrule housing 406 and/or ferrule housing flange 410 is not necessary, but providing a single fiber connector 400 may aid in assembly.

Figure 5:
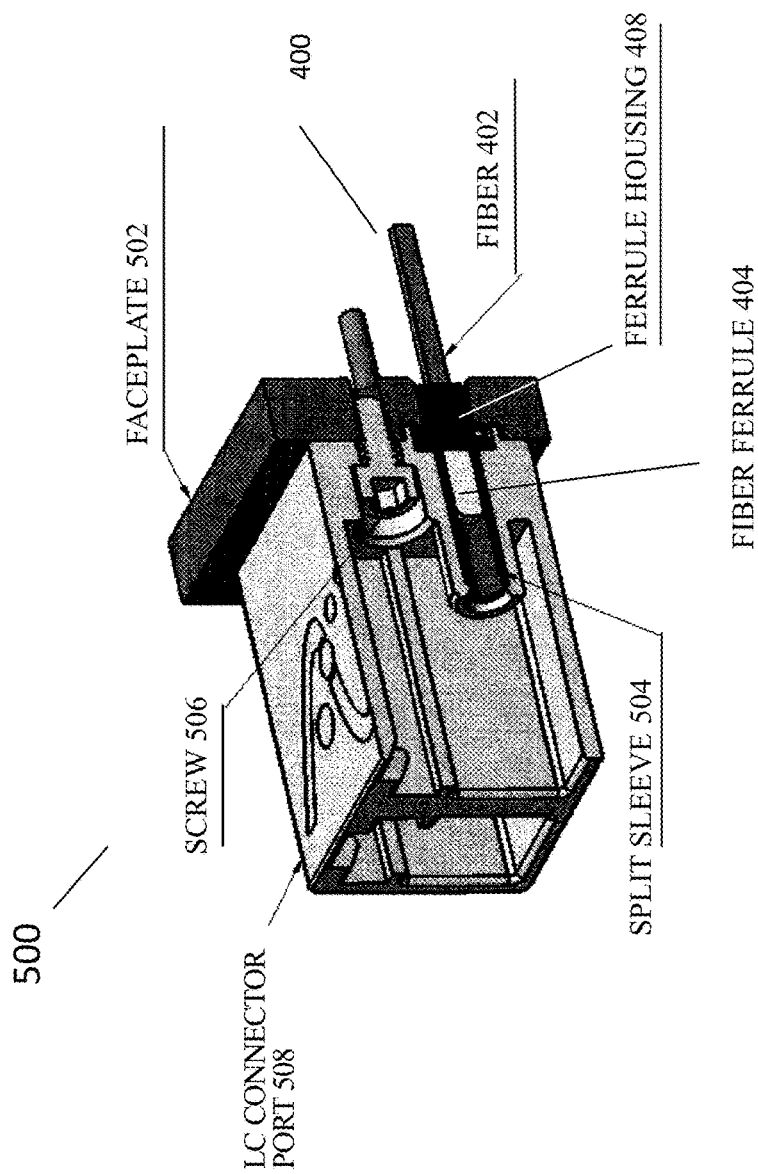
FIG. 5 depicts a custom connector configured to couple with a custom optical fiber plug, according to some embodiments.

FIG. 5 depicts a custom connector 500, according to some embodiments. Connector 500 can be configured to couple with an optical fiber using a standard LC connector port 508 on one end, and with the custom optical fiber plug 400 depicted in FIG. 4 on the other end. LC connector port 508 can be configured similarly to one of the standard LC connector ports 106, 108 depicted in FIGS. 1-3. Connector 500 can also comprise a split sleeve 504 and a faceplate 502. Split sleeve 504 can be a hollow tube or passage used to align fiber ferrule bodies. Faceplate 502 can comprise a metal, plastic, or other substantially rigid component. Faceplate 502 may be attached to LC connector port 508 using one or more socket head cap screws 506. In some embodiments, two socket head cap screws 506 can be used.

Figure 6:
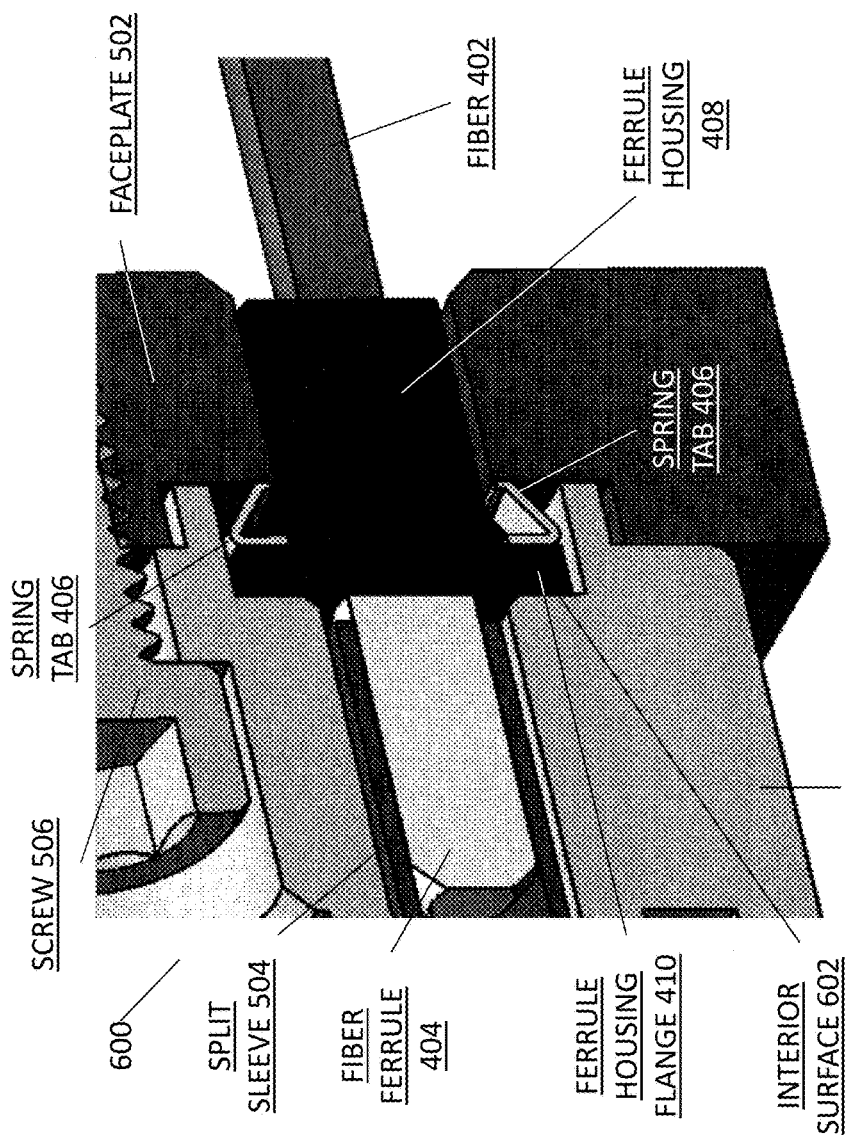
FIG. 6 is a close-up view of the custom connector, according to some embodiments.

FIG. 6 depicts a close-up view of custom connector 500, according to some embodiments. Fiber ferrule 404 of the custom optical fiber plug 400 can be configured to slide into split sleeve 504. When another optical fiber is inserted from the opposite end of adapter connector 500 (e.g., through LC connector port 508), a fiber ferrule from the opposing optical fiber can also slide into split sleeve 504 and be aligned with fiber ferrule 404, thereby allowing light to transmit between the two optical fibers. Ferrule housing flange 410 of the custom optical fiber plug 400 can be sandwiched between an interior surface 602 of LC connector port 508 and faceplate 502, thereby securing fiber plug 400 to the adapter connector 500. The one or more spring tabs 406 can push against faceplate 502, thereby compressing ferrule housing flange 410 against interior surface 602 of the LC connector port 508. This compression also pushes fiber ferrule 404 deeper into split sleeve 504 and against the fiber ferrule from the opposing optical fiber, thereby facilitating proper light transmission.

During assembly and/or installation, the faceplate 502 may be removed either partially or completely from LC connector port 508 by removing the one or more screws 506, thus exposing the interior surface 602 of LC connector port 508 and the opening of split sleeve 504. Then, fiber ferrule 404 may be inserted into split sleeve 504 and ferrule housing flange 410 may be pushed against the interior surface 602 of LC connector port 508. Next, faceplate 502 may be repositioned over the interior surface 602 of the LC connector port 508, thereby sandwiching ferrule housing flange 410 between faceplate 502 and LC connector port 508. The one or more screws 506 may be used to once again secure faceplate 502 to LC connector port 508. By appropriately tightening screws 506, faceplate 502 may cause ferrule housing flange 410 to compress against the interior surface of the LC connector port 508, and ensure an appropriate interface between fiber ferrule 404 and the ferrule of an opposing optical fiber.

Faceplate 502 may comprise materials such as plastic or metal, such as zinc, aluminum, or steel. Faceplate 502 may be formed from one or more injection-molded or machined components. In some embodiments, faceplate 502 may comprise a single monolithic component, or multiple components bonded, attached, or coupled to each other. Faceplate 502 may be attached to LC connector port 508 in various ways. Although FIGS. 5 and 6 depict faceplate 502 being attached using one or more screws 506, faceplate 502 may also be attached to LC connector port 508 using a snap fit, a friction fit, or a press fit. Faceplate 502 may also be attached using epoxy, sonic welding, or heat welding. Faceplate 502 may also take different shapes in various embodiments, including but not limited to triangular, circular, and hexagonal, shapes. Faceplate 502 need not take on a plate-like shape, but may also be formed from a component that is deeper than it is wide (e.g., extends further along the axis of fiber 402 than along one or more directions perpendicular to the axis of fiber 402). Faceplate 502 may contain an opening for fiber 402 to pass through, and the opening may also assume a variety of shapes, including without limitation, triangular, rectangular, circular, or hexagonal shapes. In some embodiments, having a removable faceplate (such as faceplate 502) may allow use of a standalone ferrule fiber assembly, thereby eliminating the need for bulky connector body inside the connector module. For instance, the removable faceplate may eliminate the need to house a full standard LC connector plug inside the connector body.

Figure 7:
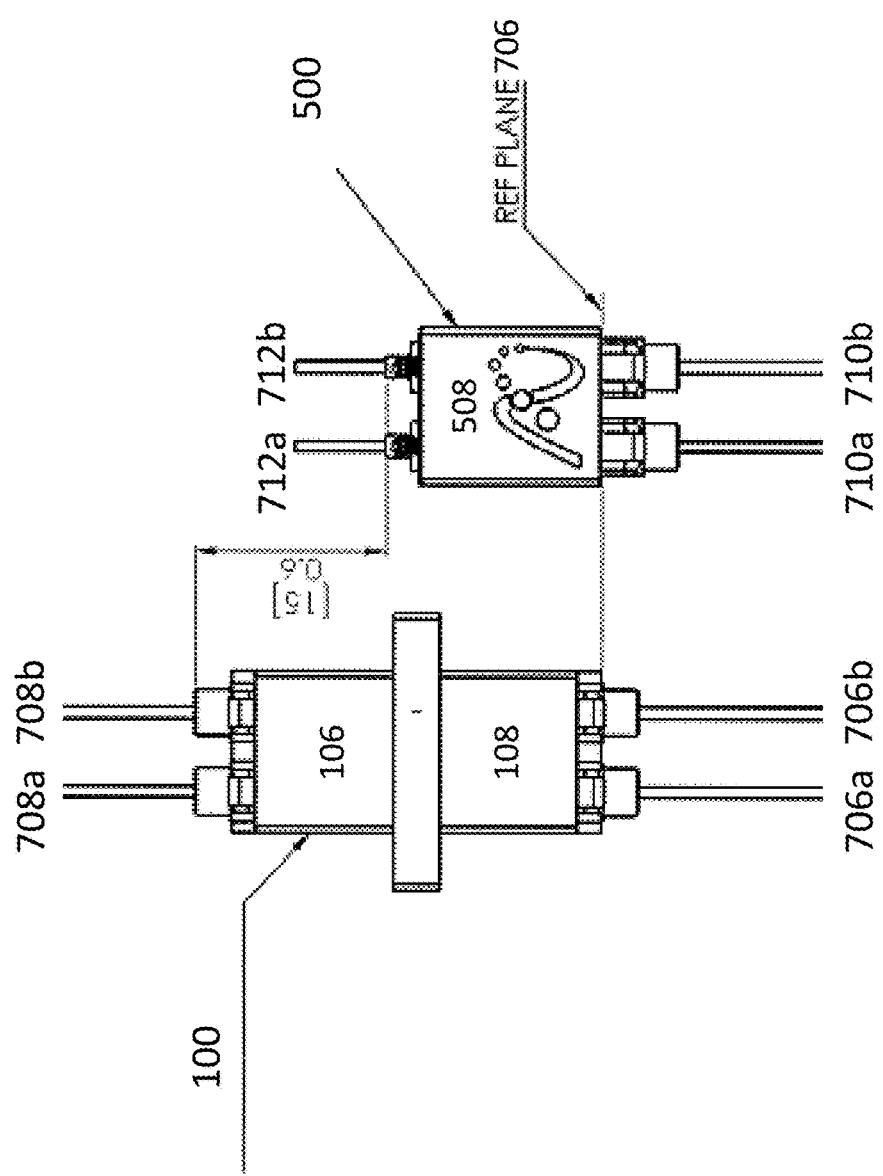
FIG. 7 depicts a side-by-side comparison of a standard LC-LC adapter connector and a custom optical connector, according to some embodiments.

FIG. 7 depicts a side-by-side comparison of a fiber-to-fiber coupling facilitated by the standard LC-LC adapter connector 100 vs. the presently disclosed custom optical connector 500, according to some embodiments. Adapter connector 100 is depicted as coupling fibers 706a and 706b with fibers 708a and 708b, wherein the optical fibers are inserted into standard LC ports 106 and 108. Custom optical connector 500 is depicted as coupling fibers 710a and 710b with fibers 712a and 712b. Fibers 710a and 710b are coupled to the connector 500 via LC connector port 508, whereas fibers 712a and 712b are coupled to the connector 500 using the custom optical fiber plugs 400 depicted in FIG. 4. As can be seen, custom optical connector 500 eliminates the need for a second LC port 106, and can therefore save significant space compared to the standard optical connector 100. In some embodiments, the length of custom optical connector 500, as measured from reference plane 706, can be up to 15 mm, or 0.6 inches, shorter than the length of standard LC connector 100. This saved space allows more freedom in space constrained design of optical modules.

While custom optical connector 500 is depicted as having one standard LC port 508 coupled to a single faceplate 502, other embodiments which dispense with the standard LC port 508 are also possible. For example, an optical connector may be configured to interface with the custom optical fiber plug 400 on both opposing ends of the connector instead of only on one end. The optical connector in such embodiments may comprise a substantially rigid body with a split sleeve disposed within, wherein opposing sides of the body are covered with a faceplate. Both opposing faceplates may be secured to the body with one or more screws. In this way, the optical connector may be configured to receive the custom optical plug 400 on both opposing ends of the connector instead of only at a single end. Receiving the custom optical plug 400 on both opposing ends can enable the optical connector to save even more space in optical module assemblies.

The invention claimed is:

1. A compact optical fiber connector, comprising:
   a connector body comprising a first end configured to couple with a first optical fiber; and
   a faceplate configured to be coupled to a second end of the connector body opposite the first end, wherein the faceplate defines an opening for a second optical fiber to pass through the faceplate;
   wherein the second end of the connector body defines an interior volume configured to receive a flange that extends radially outward from a longitudinal axis of the second optical fiber when the faceplate is at least partially detached from the second end of the connector body to receive the flange, the flange comprising one or more spring tabs configured to push against an interior surface of the faceplate when the faceplate is re-attached to the second end of the connector body, thereby biasing the flange against an interior surface of the second end of the connector body.

2. The compact optical fiber connector of claim 1, wherein the first end of the connector body comprises a standard LC connector port for receiving a standard LC plug attached to the first optical fiber.

3. The compact optical fiber connector of claim 1, further comprising:
   a split sleeve configured to receive and align a first fiber ferrule from the first optical fiber and a second fiber ferrule from the second optical fiber.

4. The compact optical fiber connector of claim 1, wherein the flange is shaped in the form of at least one of a disc, a rectangle, a triangle, and a hexagon.

5. The compact optical fiber connector of claim 1, wherein the flange has a diameter that is greater than a diameter of the second optical fiber.

6. The compact optical fiber connector of claim 1, wherein the faceplate is configured to be detachably coupled to the second end of the connector body using one or more screws.

7. The compact optical fiber connector of claim 1, wherein the faceplate is configured to be coupled to the second end of the connector body using at least one of a snap fit, a friction fit, a press fit, epoxy, sonic welding, and heat welding.

8. The compact optical fiber connector of claim 1, wherein each spring tab comprises at least one of a compression spring, wavy washer, finger washer, and photo etched spring tab.

9. The compact optical fiber connector of claim 1, wherein each spring tab is coupled to the flange using at least one of a press fit, adhesive, and screws.

10. The compact optical fiber connector of claim 1, wherein each spring tab is removably coupled to the flange.

11. The compact optical fiber connector of claim 1, wherein each spring tab is an integral part of the flange.

12. The compact optical fiber connector of claim 1, wherein the faceplate comprises at least one of plastic and metal.

13. A method of connecting optical fibers, comprising:
    providing an optical fiber connector comprising:

a connector body comprising a first end configured to couple with a first optical fiber; and a faceplate configured to be coupled to a second end of the connector body opposite the first end, wherein:
the faceplate defines an opening, and
the second end of the connector body defines an interior volume;

providing a first optical fiber;

providing a second optical fiber having a flange that extends radially outward from a longitudinal axis of the optical fiber, the flange comprising one or more spring tabs;

coupling the first optical fiber with the first end of the connector body;

coupling the second optical fiber with the second end of the connector body by positioning the flange of the second optical fiber within the interior volume defined by the second end of the connector body when the faceplate is at least partially detached from the second end of the connector body;

passing the second optical fiber through the opening of the faceplate; and coupling the faceplate to the second end of the connector body such that the one or more spring tabs of the flange push against an interior surface of the faceplate, thereby biasing the flange against an interior surface of the second end of the connector body.

14. The method of claim 13, wherein the first end of the connector body comprises a standard LC connector port for receiving a standard LC plug attached to the first optical fiber.

15. The method of claim 13, wherein:
the connector body further comprises a split sleeve having a first end and a second end, the first optical fiber includes a first fiber ferrule, and the second optical fiber includes a second fiber ferrule,
coupling the first optical fiber with the first end of the connector body comprises inserting the first fiber ferrule into the first end of the split sleeve; and
coupling the second optical fiber with the second end of the connector body comprises inserting the second fiber ferrule into the second end of the split sleeve.

16. The method of claim 13, wherein the flange is shaped in the form of at least one of a disc, a rectangle, a triangle, and a hexagon.

17. The method of claim 13, wherein the flange has a diameter that is greater than a diameter of the second optical fiber.

18. The method of claim 13, wherein coupling the faceplate to the second end of the connector body includes coupling the faceplate to the second end using one or more screws.

19. The method of claim 13, wherein coupling the faceplate to the second end of the connector body includes coupling the faceplate to the second end using at least one of a snap fit, a friction fit, a press fit, epoxy, sonic welding, and heat welding.

20. The method of claim 13, wherein each spring tab comprises at least one of a compression spring, wavy washer, finger washer, and photo etched spring tab.

* * * * *